United States Patent [19]

Unterman et al.

[11] Patent Number: 5,494,574
[45] Date of Patent: Feb. 27, 1996

[54] MECHANICALLY MIXED PACKED BED BIOREACTOR

[75] Inventors: Ronald Unterman, Lawrenceville, N.J.; Brian R. Folsom, Yardley, Pa.; A. Paul Togna, Plainsboro, N.J.

[73] Assignee: Envirogen, Inc., Lawrenceville, N.J.

[21] Appl. No.: 287,869

[22] Filed: Aug. 9, 1994

[51] Int. Cl.$^6$ ......................................... C02F 3/04
[52] U.S. Cl. .................. 210/150; 210/194; 210/197; 210/618; 210/188; 55/233; 435/266
[58] Field of Search .................... 210/150, 151, 210/617, 618, 195.1, 194, 195.3, 197, 188; 55/233; 435/266

[56] References Cited

U.S. PATENT DOCUMENTS

| | | | |
|---|---|---|---|
| 2,200,580 | 5/1940 | Prüss et al. | 210/150 |
| 4,009,099 | 2/1977 | Jeris | 210/151 |
| 4,177,144 | 12/1979 | Hickey et al. | 210/151 |
| 4,482,458 | 11/1984 | Rovel et al. | 210/150 |
| 4,707,252 | 11/1987 | Durot et al. | 210/618 |
| 4,806,148 | 2/1989 | Ottengraf | 210/151 |

FOREIGN PATENT DOCUMENTS

| | | |
|---|---|---|
| 2626868 | 8/1989 | France . |
| 62-79896 | 4/1987 | Japan . |

*Primary Examiner*—Christopher Upton
*Attorney, Agent, or Firm*—Miller & Christenbury

[57] ABSTRACT

A bioreactor for separating contaminants from fluid and degrading the separated contaminants is disclosed.

10 Claims, 3 Drawing Sheets

MECHANICALLY MIXED PACKED BED BIOREACTOR

FIELD OF THE INVENTION

The present invention relates to a mechanically mixed packed bed bioreactor, particularly to a bioreactor for separating contaminants from fluids and degrading the separated contaminants.

BACKGROUND OF THE INVENTION

It is increasingly important in view of stricter environmental regulations concerning liquid and gaseous waste from industrial and municipal facilities to provide apparatus and systems that effectively and efficiently remove contaminants from such effluents and simultaneously degrade the removed contaminants. Many prior efforts in the field have concentrated on the often difficult task of separating contaminants from the liquid or gaseous carrier. However, mere separation of the contaminant from the carrier liquid or gas without disposal oftentimes does not satisfy regulatory requirements.

Also, separation creates the problem of disposal of the separated contaminant, which is increasingly a problem in view of increasing limitations placed on contaminant disposal. Therefore, it has been highly desirable to provide an apparatus capable of not only separating contaminants from effluent carriers, but also degrading the separated contaminants substantially simultaneously. Otherwise, alternate methods of contaminant disposal must be contemplated subsequent to separation. Unfortunately, many degradation apparatus and methods have proven unsuitable for combination with many current separation techniques whereby both may be simultaneously combined in an effective and efficient manner.

A commonly used vapor-phase simultaneous separation and degradation process is biofiltration. Biofiltration utilizes microorganisms immobilized in the form of a biofilm layer on a porous, moist, organic filter packing such as compost, peat or wood chips to oxidize vapor-phase contaminants completely to carbon dioxide, water and mineral salts at ambient conditions. Biofilters have been used in Europe for over 30 years to control odorous air emissions. Biofilters have also been used in the United States to treat hydrogen sulfide, alcohols and other odor-causing air-borne contaminants emitted from wastewater treatment plants, industrial process streams and composting facilities. Recent advances in biofilter technology have expanded the range of treatable target compounds to include many odor-causing VOCs and air toxics as well.

Another type of biological system used to treat air-borne contaminants is a biotrickling filter. Biotrickling filters are similar to biofilters but contain scrubber packing material instead of compost, peat or wood chips and operate with liquid flow over the packing co-current or counter-current to the flow of vapor. Biofilters are typically not operated with continuous liquid flow over the packing.

The pH of the recirculating liquid within biotrickling filters is monitored and controlled by the automatic addition of acid or base. However, the pH within biofilters is controlled by the addition of solid calcium carbonate or lime to the packing material at the beginning of operation. Once this buffering capacity is exhausted, the filter bed is removed and replaced with fresh material. Biofilter bed replacement can be quite frequent for the biodegradation of halogenated contaminants. Therefore, biotrickling filters are often more cost effective than biofilters for treatment of halogenated contaminants such as methylene chloride.

However, biotrickling filters suffer from operational drawbacks in that the packing material is subject to buildups of biologically active materials, crusting, clogging and the like. This clogging usually occurs where the vapors enter the biotrickling filter, where most of the biological growth occurs. The result is uneven vapor distribution, vapor and/or liquid channeling and/or reduced vapor residence time-all of which are highly detrimental to system performance. Elimination of these drawbacks via prevention and removal of the buildups is a main object of this invention.

OBJECTS OF THE INVENTION

It is accordingly an object of the invention to provide an apparatus capable of separating contaminants from a variety of effluent carriers.

It is another object of the invention to provide a separating apparatus substantially simultaneously capable of biologically degrading separated contaminants.

It is yet another object of the invention to provide an apparatus capable of separating contaminants from effluent and biologically degrading the separated contaminants, the separation and degrading being performed in a single self-contained apparatus.

It is yet another object of the invention to provide a method for mechanically removing packing from part of the apparatus, cleaning the packing to remove buildup materials, and returning the cleaned packing to another part of the apparatus for reuse.

Other objects and advantages of the invention will become apparent to those skilled in the art from the drawings, the detailed description of preferred embodiments and the appended claims.

SUMMARY OF THE INVENTION

One aspect of the invention includes a bioreactor for separating contaminants from liquids and degrading the separated contaminants. The bioreactor includes a reaction chamber having a contaminated liquid inlet located at a lower portion of the chamber and a decontaminated liquid outlet located at an upper portion of the chamber. Packing material is located within the reaction chamber. Microorganisms are positioned in the packing material, the microorganisms being capable of separating the contaminants from the fluid and biologically degrading the contaminants subsequent to separation from the fluid. Means are provided for circulating the packing material within the reaction chamber at a very slow rate.

Another aspect of the invention is a bioreactor for separating contaminants from gases and degrading the separated contaminants. This aspect includes a reaction chamber having a contaminated gas inlet located at an upper portion of the chamber and a decontaminated gas outlet located at a lower portion of the chamber. Packing material is located within the reaction chamber. Microorganisms are located on the packing material, the microorganisms being capable of separating the contaminants from the gas and degrading the contaminants subsequent to separation from the gas. Means are provided to circulate the packing material within the reaction chamber at a slow rate.

DETAILED DESCRIPTION OF THE INVENTION

Figure 1:
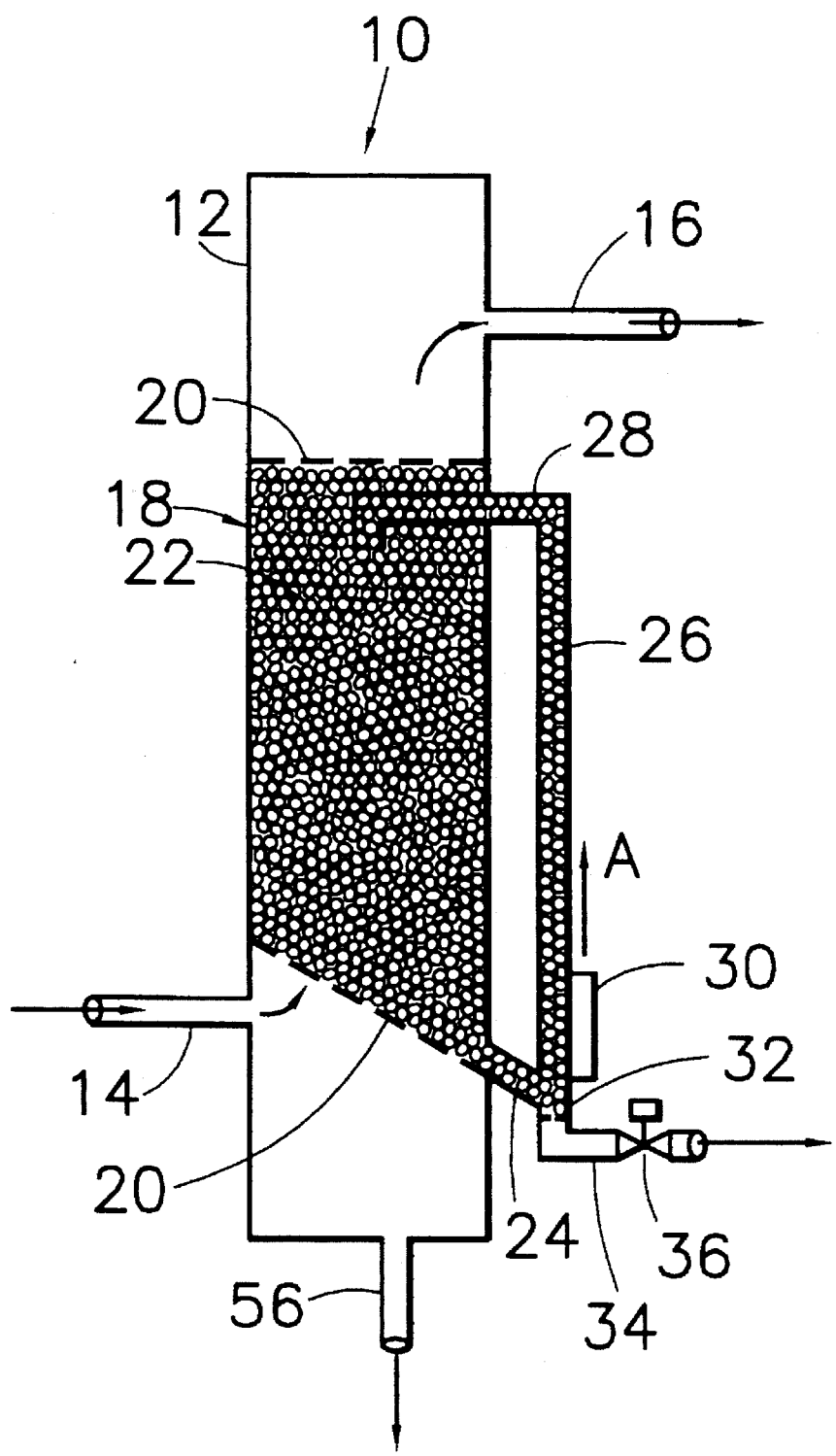
FIG. 1 is a schematic front elevational view, partly taken in section, of a mechanically mixed packed bed bioreactor for treating contaminated liquids in accordance with aspects of the invention.

It will be appreciated that the following description is intended to refer to specific aspects of the invention selected for illustration in the drawings and is not intended to define or limit the invention other than in the appended claims.

Turning now to the drawings in general, several embodiments of a bioreactor in accordance with aspects of the invention are shown. Referring specifically to FIG. 1, a first embodiment of a bioreactor 10 is shown. Bioreactor 10 separates contaminants from liquids, degrades the separated contaminants and includes a body 12, a contaminated liquid inlet 14 located at a lower portion of body 12 and a decontaminated liquid outlet 16 located at an upper portion of body 12. Body 12 includes a reaction chamber 18 located in a middle portion of body 12, reactor chamber 18 being defined on its upper and lower ends by screens 20. Reaction chamber 18 is filled with packing material 22.

A packing material outlet 24 connects to a lower portion of reaction chamber 18 just upwardly of screen 20 and is sized to receive packing material from reaction chamber 18. The packing material outlet 24 connects to conveyor 26 which extends upwardly and connects to packing material inlet 28. Packing material inlet 28 extends inwardly into an upper portion of reaction chamber 18, just below screen 20. Conveyor 26 contains a motor 30 which moves packing material upwardly through conveyor 26 in the direction shown by arrow A. A screen 32 located at the bottom of conveyor 26 retains packing material within packing material outlet 24 and conveyor 26. Below screen 32, conveyor 26 connects to waste conduit 34, which has valve 36. An alternate waste conduit 56 also connects to body 12.

Packing material 22 is provided with microorganisms capable of separating contaminants from liquids as the liquids pass through packing material 22 and also degrading the separated contaminants. The microorganisms are not shown in FIG. 1.

Figure 2:
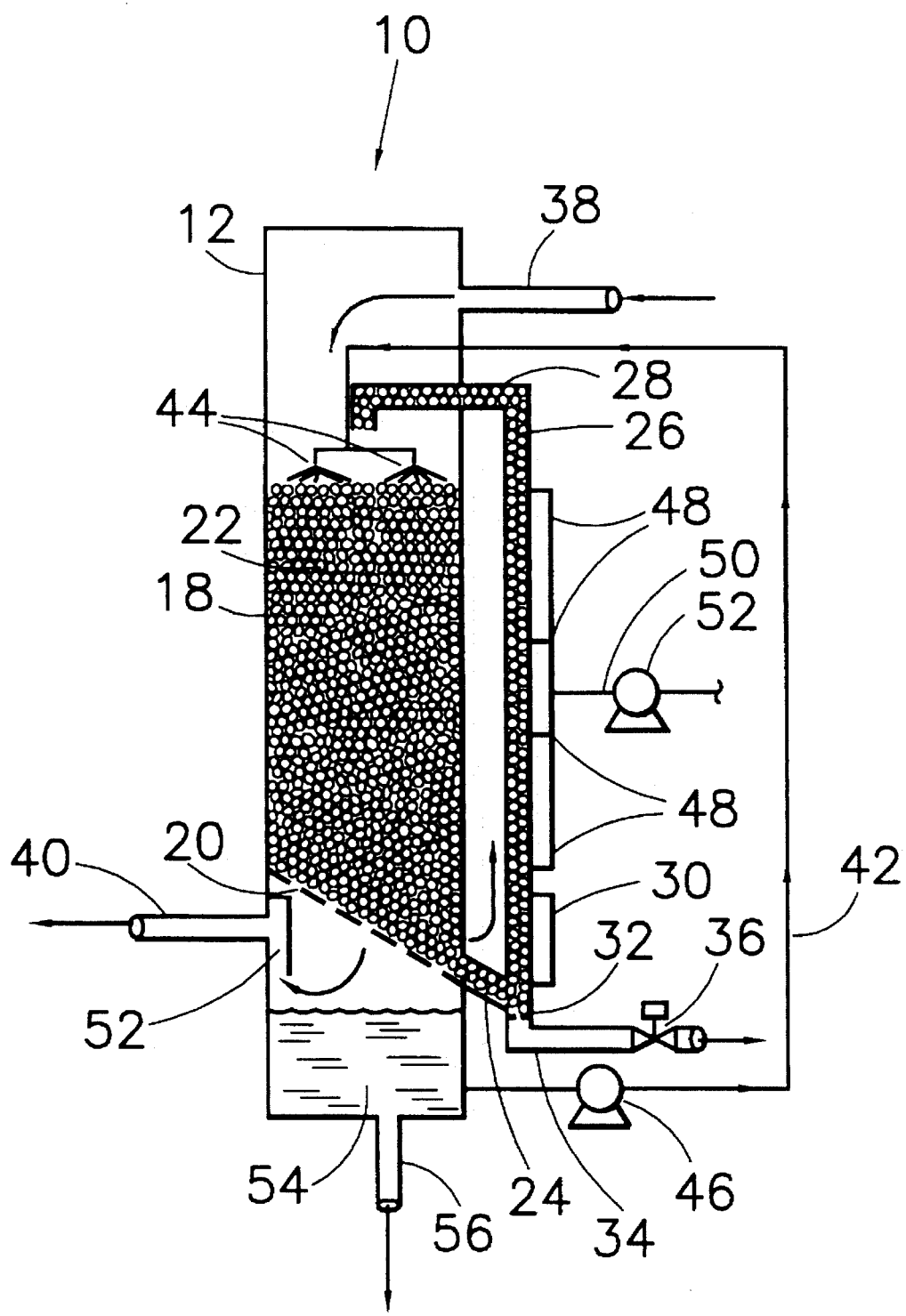
FIG. 2 is a schematic front elevational view, partly taken in section, of a mechanically mixed packed bed bioreactor for treating contaminated gases in accordance with another embodiment of the invention.

FIG. 2 shows another embodiment of bioreactor 10 in accordance with aspects of the invention. Bioreactor 10 as shown in FIG. 2 contains similarities to the embodiment shown in FIG. 1, although it is primarily intended to be used in connection with contaminated gases. In particular, bioreactor 10 includes a body 12, a contaminated vapor inlet 38 located at an upper portion of body 12 and a decontaminated gas outlet 40 located at a lower portion of body 12. The decontaminated gas outlet 40 is shielded within body 12 by a baffle 52.

A reaction chamber 18 is located in a middle portion of body 12, the lower portion of reaction chamber 18 being defined by screen 20. Packing material 22 is positioned above screen 20 and occupies the balance of reaction chamber 18. Packing material 22 is equipped with microorganisms in the same manner as the embodiment shown in FIG. 1, except that the microorganisms are capable of separating contaminants from gases and then degrading the contaminants.

A packing material outlet 24 connects to body 12 at a point just above screen 20 and connects to conveyor 26, which extends upwardly alongside body 12 and connects to packing material inlet 28. Motor 30 connects to conveyor 26 which causes upward movement of packing material 22 along conveyor 26. A screen 32 is located near the bottom portion of conveyor 26 and prevents packing material from extending into waste conduit 34 which connects to the lower portion of conveyor 26. Valve 36 connects to waste conduit 34. Alternate waste conduit 56 connects to the bottom of body 12.

Liquid recirculation conduit 42 connects to a lower portion of body 12 and reconnects to body 12 at an upper portion, above reaction chamber 18. Recirculation conduit 42 extends inwardly of body 12 and contains a number of sprayers 44 that are located just above packing material 22. Pump 46 connects to recirculation conduit 42 to effect spraying. Sprayers 48 connect to water supply line 50 which has a pump 52 to effectuate spraying within conveyor 26. Recirculation water 54 is located at the bottom of body 12 and is pumped through recirculation conduit 42 by pump 46.

Operation of the apparatus of the invention will now be described below.

Referring to FIG. 1, contaminated liquid is introduced through contaminated liquid inlet 14 into the lower portion of body 12. Representative contaminants include water containing petroleum hydrocarbons, benzene/toluene/ethylbenzene/xylenes (BTEX) and trichloroethylene (TCE), although other contaminants are possible, either alone or in combination. The liquid fills the lowermost portion (unlabelled) of body 12 and move upwardly through perforated screen 20 and through and into contact with packing material 22. Packing material 22 is supplied with microorganisms such as Pseudomonas, Actinomyces, other bacteria, fungi and molds, for example, which can degrade the contaminant or contaminants carried by the liquid introduced through contaminated liquid inlet 14. Upon passing into contact with the microorganisms in packing material 22, contaminants within the contaminated liquid are separated from the liquid and degraded. Degradation of the contaminant occurs by the usual mechanism of the particular microorganisms employed. The liquid continues to flow upwardly through packing material 22, through perforated screen 20 and into an upper portion (unlabelled) of body 12. Cleaned liquid flows outwardly of body 12 through decontaminated liquid outlet 16.

During operation, packing material 22 is continuously circulated at a very slow rate. Motor 30 operates a conveyor such as a screw, belt, hydraulic jet or the like which causes packing material 22 within conveyor 26 to move upwardly. This causes the quantity of packing material in the lower portion of conveyor 26 and packing material outlet 24 to decrease, thereby permitting more packing material 22 from reactor chamber 18 to flow into packing material outlet 24. Simultaneously, circulated packing material 22 flows into body 12 by way of packing material inlet 28 and is redeposited at the upper portion of reaction chamber 18. Packing material 22 circulates at a rate of about one cycle per month, depending on reactor chamber characteristics, packing material characteristics, flow rates, contaminants, microorganisms and the like. In this way, biomass buildups are distributed evenly within reaction chamber 18.

During recirculation, both in conveyor 26 and in reaction chamber 28, waste materials such as dead microorganisms, degradation products and the like flow generally to the bottom of conveyor 26 and into waste conduit 34. Waste materials may be removed by way of valve 36 on a periodic or continuous basis, as needed.

Referring to FIG. 2, contaminated gases are decontaminated in bioreactor 10. Contaminated vapor, such as air containing benzene, styrene and/or methylene chloride, is introduced into body 12 through contaminated vapor inlet 38. The vapor moves downwardly through body 12 and into reaction chamber 18. Contaminated vapor contacts packing material 22 in the same manner as described in FIG. 1. Decontaminated gases pass downwardly through perforated screen 20, past baffle 52 and outwardly of body 12 through decontaminated gas outlet 40.

Packing material 22 circulates in the same manner as described with respect to FIG. 1. However, a water spray is provided through sprayers 48, water supply line 50 and pump 52 to remove biomass buildups from the recirculated packing material within conveyor 26. Waste biomass is removed by way of waste conduit 34 and valve 36 as needed in the same manner as described with respect to FIG. 1.

Packing material 22 is sprayed while residing in reaction chamber 18. This occurs by removing liquid media 54 from the lowermost portion of body 12 with pump 46 by way of recirculation conduit 42. Recirculated liquid media is sprayed over packing material 22 by way of sprayers 44.

EXAMPLE

A packed bed bioreactor is constructed from a 4 in. diameter×3 ¼ ft long glass chromatography column filled to a depth of 2 feet with a ceramic packing supported on a plastic perforated plate approximately 8 inches from the bottom of the column. A screw conveyor is connected to the column, together with associated conduits and connections, to circulate and mix the packing material as shown in FIG. 2. Liquid media is recirculated from the bottom to the top of the column through an external pump at a rate of approximately 420 mL/min (1.3 gpm/ft$^2$). The pH of the recirculating liquid is maintained at about 7.0 by automatic addition of 5 N NaOH using an in-line pH probe and controller. Fresh media is added to the system at a rate of approximately 850 mL/day, and liquid is removed from the bottom of the column at a rate of approximately 200 mL/day.

The flow of vapor through the column is downward, co-current to the flow of liquid. The vapor flowrate through the column is changed periodically from 5 to 2.5 to 1.7 L/min resulting in vapor contact times (nominal packing volume divided by volumetric flowrate) of 1, 2 and 3 minutes, respectively. The concentration of contaminant in the influent air stream is varied between 15 and 3400 ppmv by mixing a 7800 ppmv contaminant/air mixture (AIRCO) with pure air and passing this mixed stream through the column.

The bioreactor is inoculated with approximately 110 mL of a contaminant-degrading mixed culture. The packing material is recirculated such that the entire volume of packing material recycles once per month.

Comparative Example 1

A packed bed bioreactor is constructed from a 4 in. diameter×3¼ ft long glass chromatography column filled to a depth of 2 feet with a ceramic packing supported on a plastic perforated plate approximately 8 inches from the bottom of the column. Liquid media is recirculated from the bottom to the top of the column through an external pump at a rate of approximately 420 mL/min (1.3 gpm/ft$^2$). The pH of the recirculating liquid is maintained at about 7.0 by automatic addition of 5 N NaOH using an in-line pH probe and controller. Fresh media is added to the system at the rate of approximately 850 mL/day and liquid is removed from the bottom of the column at a rate of approximately 200 mL/day.

The flow of vapor through the column is downward, co-current to the flow of liquid. The vapor flow rate through the column is changed periodically from 5 to 2.5 to 1.7 L/min resulting in vapor contact times (nominal packing volume divided by volumetric flowrate) of 1,2 and 3 minutes, respectively. The concentration of contaminant in the influent air stream is varied between 15 and 3400 ppmv by mixing a 7800 pppmv contaminant/air mixture (AIRCO) with pure air and passing this mixed stream through the column. The bioreactor is inoculated with approximately 110 mL of a contaminant-degrading mixed culture.

Comparative Example 2

A biofilter is constructed from a 4 in. diameter×3¼ ft long glass chromatography column filled to a depth of 2 feet with a peat moss-based biofilter packing mix supported on a plastic perforated plate approximately 8 inches from the bottom of the column. The moisture content of the packing is maintained by (1) prehumidifying the inlet vapor stream and (2) adding water to the top of the packing on a timed cycle every four hours through a fine mist nozzle. A small amount of liquid waste is periodically removed from the bottom of the column.

The flow pattern of vapor through the column under consideration is downflow. The vapor flowrate (contact time) and contaminant concentration of the inlet biofilter vapor stream should be the same at all times as those of the inlet vapor stream in the Examples above, The biofilter packing is inoculated with approximately 125 mL of the same contaminant-degrading culture used in the Examples above.

Example versus Comparative Examples

At all vapor contact times, the performance of the invention Example is superior to the performance of Comparative Example 2. Performance curves are directly compared at a vapor contact time of 3 minutes in FIG. 3. At a vapor contact time of 3 minutes, the elimination capacity of the invention Example and Comparative Example 1 would be as much as 4 times greater than that of Comparative Example 2, and the invention Example's removal efficiency would be expected to be about 95 percent versus 40 percent for Comparative Example 2.

Figures 3, 4:
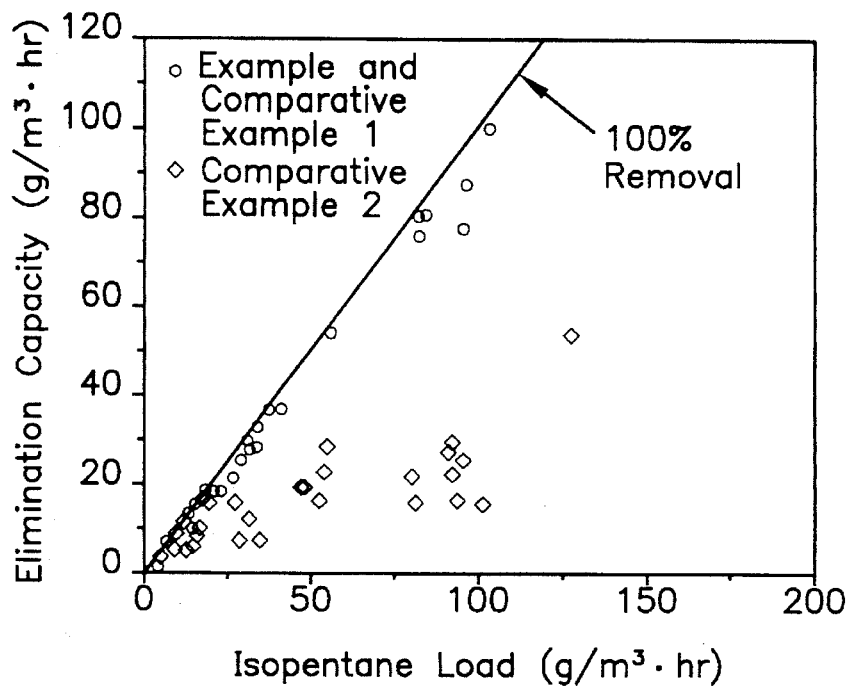
FIG. 3 is a graph of contaminant load versus elimination capacity for an Example of the invention compared to the Comparative Examples.
FIG. 4 is a graph of pressure drop over time and cumulative mass removal over time for an Example of the invention compared to the Comparative Examples.

FIG. 4 shows an increase in pressure drop for the Comparative Examples' packing over time and the total expected (cumulative) mass of contaminant removed from the inlet vapor streams. There is no corresponding increase for the invention. 190 days after start-up the cumulative mass of contaminant removed from the inlet vapor stream of Comparative Example 1 would be approximately 100 kilograms per cubic meter of packing (6.9 lb/ft$^3$) and the pressure drop across the packing would be approximately 8.5"H$_2$O/ft. The total mass of contaminant to be removed from the inlet biofilter vapor stream would be approximately 50 percent of the total mass removed from the inlet biotrickling filter vapor stream.

These results indicate that the invention and Comparative Example 1 would have a higher degree of separation efficiency than Comparative Example 2. However, after approximately 190 days of operation, both of the Comparative Examples would begin to plug or clog as indicated by the increase in pressure drop across the packing. This would not occur in the invention Example since it is self-cleaning and can continue operations virtually indefinitely. This is a great advantage over biofilters and conventional biotrickling filters that are subject to limited times of use before system inefficiencies result from clogging.

The biomass produced in the invention apparatus includes nothing more than dead cell mass and residual nutrients and carrier fluid. Therefore, no special disposal procedures or apparatus is required.

Although this invention has been described in connection with specific forms thereof, it will be appreciated that a wide array of equivalents may be substituted for the specific elements shown and described herein and that a wide array of equivalents may be substituted for the apparatus and structure described herein without departing from the spirit of this invention as described in the appended claims. For example, various types of packing material 22, such as Tri-Packs® from Jaeger Products, Inc., and ceramic rings may be utilized so long as it is compatible with the microorganisms and the mixing mechanism. Multiple types of screens 22 and 32 may be used so long as they maintain packing material 22 in the desired position. Also, additional nutrients for the microorganisms, pH buffers and the like may be introduced into body 12 as needed.

What is claimed is:

1. A bioreactor for separating contaminants from a contaminated gas and degrading separated contaminants comprising:

a contaminated gas source;

a reaction chamber having a contaminated gas inlet positioned in an upper portion of said reaction chamber and a decontaminated gas outlet positioned in a lower portion of said reaction chamber, said contaminated gas inlet being connected to said contaminated gas source;

packing material located within said reaction chamber;

microorganisms associated with said packing material, said microorganisms being capable of separating said contaminants from said contaminated gas and degrading said contaminants subsequent to separation from said contaminated gas; and a packing material circulator connected to said reaction chamber, wherein said packing material circulator includes a packing material outlet located in a wall of said reaction chamber in said lower portion of said reaction chamber, a packing material inlet located in said wall of said reaction chamber in said upper portion of said reaction chamber and a packing material conveyor connected to said packing material inlet and said packing material outlet.

2. The bioreactor defined in claim 1 wherein said packing material conveyor is selected from the group consisting of a screw and a belt 3. The bioreactor defined in claim 1 further comprising a liquid waste outlet connected to said reaction chamber.

4. The bioreactor defined in claim 1 further comprising a waste biomass outlet connected to said packing material circulator.

5. The bioreactor defined in claim 1 further comprising means for recirculating liquids over said packing material in said reaction chamber.

6. The bioreactor defined in claim 5 wherein said means for recirculating liquids introduces said liquids into said upper portion of said reaction chamber and receives liquids from said lower portion of said reaction chamber.

7. The bioreactor defined in claim 1 further comprising means for cleaning said packing material within said packing material conveyor.

8. The bioreactor defined in claim 7 wherein said means for cleaning said packing material includes a liquid spray introduced along at least a portion of said packing material conveyor.

9. The bioreactor defined in claim 1 wherein said packing material conveyor is set to circulate said packing material at a rate of one cycle through said reaction chamber in no less than about one month.

10. A bioreactor for separating contaminants from a contaminated gas and degrading separated contaminants comprising:

a reaction chamber with a wall containing a packing material, said reaction chamber having a contaminated gas inlet positioned in said wall in an upper portion of said reaction chamber, a decontaminated gas outlet positioned in said wall in a lower portion of said reaction chamber, a packing material outlet positioned in said wall in said lower portion of said reaction chamber, and a packing material inlet positioned in said wall in said upper portion of said reaction chamber;

a contaminated gas source connected to said contaminated gas inlet;

microorganisms associated with said packing material, said microorganisms being capable of separating said contaminants from said contaminated gas and degrading said separated contaminants; and a packing material circulator connected to said packing material outlet and to said packing material inlet of said reaction chamber for circulating said packing material, said packing material circulator having a packing material conveyor connected to convey said packing material through said packing material circulator from said packing material outlet to said packing material inlet.

* * * * *